Nov. 12, 1963   R. R. GRIFFEN   3,110,186
CENTRIFUGAL WEIGHT ASSEMBLY
Filed Dec. 13, 1960   2 Sheets-Sheet 1
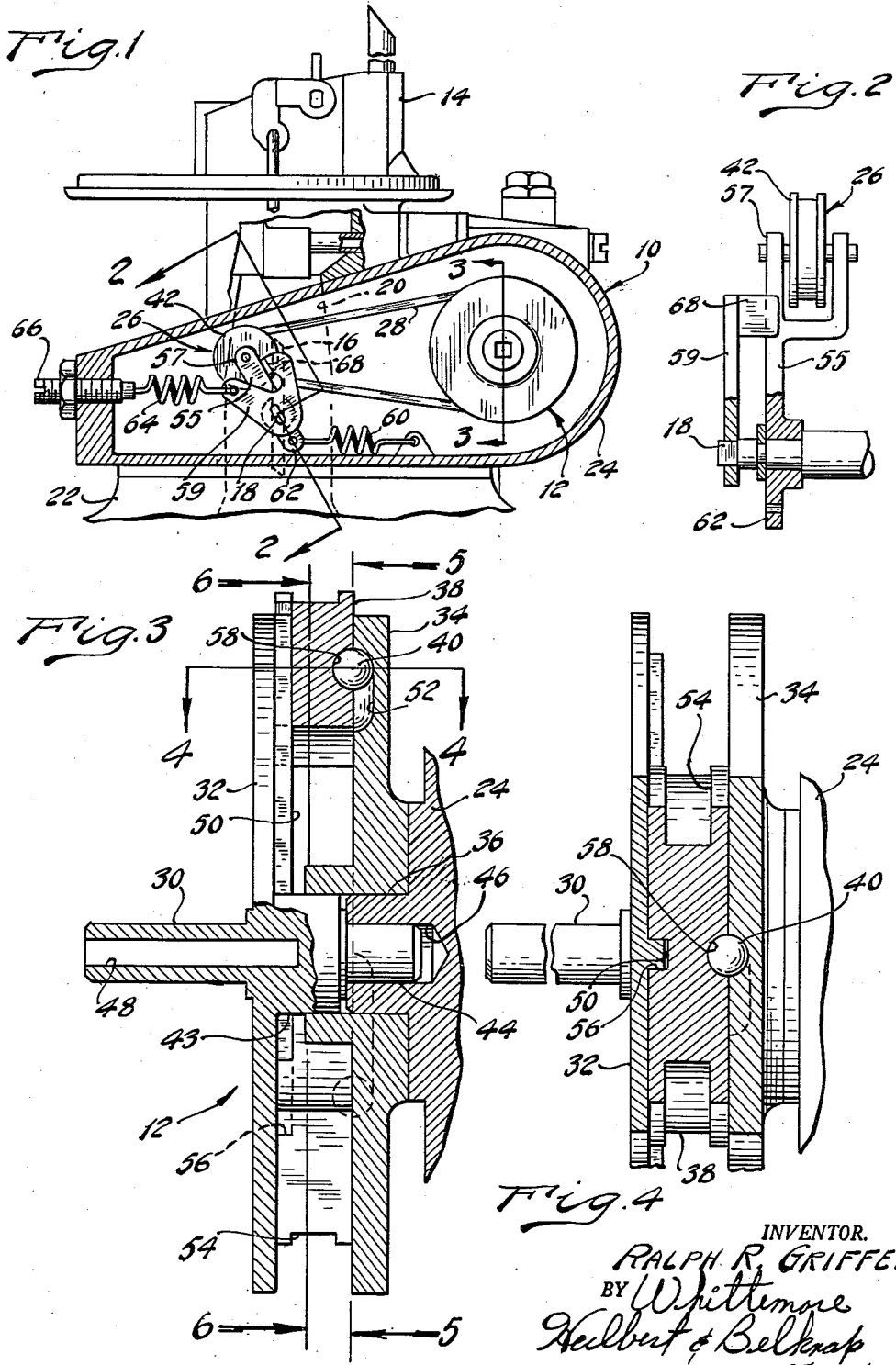
INVENTOR.
RALPH R. GRIFFEN
BY Whittemore
Hulbert & Belknap
ATTORNEYS Nov. 12, 1963  R. R. GRIFFEN  3,110,186
CENTRIFUGAL WEIGHT ASSEMBLY
Filed Dec. 13, 1960  2 Sheets-Sheet 2

INVENTOR.
RALPH R. GRIFFEN
BY Whittemore
Hulbert & Belknap
ATTORNEYS

United States Patent Office 3,110,186
Patented Nov. 12, 1963

3,110,186
CENTRIFUGAL WEIGHT ASSEMBLY
Ralph R. Griffen, Roseville, Mich., assignor to Holley Carburetor Company, Warren, Mich., a corporation of Michigan
Filed Dec. 13, 1960, Ser. No. 75,562
6 Claims. (Cl. 73—535)

The invention relates to governors and refers more specifically to a compact completely mechanical governor for use with an internal combustion engine or similar device including an improved centrifugal weight assembly.

Mechanical governors of the past wherein a centrifugal weight assembly has been used as a pulley of variable peripheral dimension in conjunction with a belt travelling therearound to provide an actuating force for the governor in accordance with the speed of rotation of the centrifugal weight assembly have been deficient in that the individual weights of the centrifugal weight assembly have not been sufficiently controlled during that portion of their travel wherein they are not restrained by the belt.

In prior devices as the centrifugal weights forming the pulley rotate into a position wherein they are not restrained by the travelling belt they move radially outwardly with respect to the weights restrained by the belt so that it is required to move the weights radially inwardly when they are subsequently rotated into a position wherein they are restrained by the belt. Such radial movement of the individual weights produces objectionable noise in the operation of the mechanical governor and causes excessive wear therein.

Therefore it is one of the objects of the present invention to provide an improved mechanical governor for an internal combustion engine or the like comprising speed responsive means for developing a force proportional to the speed to be governed including a centrifugal weight assembly forming a pulley of variable peripheral dimension made up of a plurality of angularly spaced weights and means for similarly limiting the radial movement of the weights, and means for controlling the speed in accordance with the force developed.

Another object is to provide a mechanical governor as set forth above wherein the means for similarly limiting the radial position of the weights comprises an end plate fixed to a rotatable shaft having means for guiding the individual weights in their radial movement, a second end plate rotatably sleeved on said shaft having angular grooves therein extending at an angle to the radii of the shaft and balls carried by the individual weights and extending into the grooves.

Another object is to provide a centrifugal weight assembly comprising a rotatable shaft, angularly spaced radially extending guide means secured to the shaft for rotation therewith, a separate weight slidably mounted on each of the guide means, and means for preventing any individual weight from moving radially outwardly further than any other individual weight.

Another object is to provide a centrifugal weight assembly comprising a rotatable shaft, an end plate secured to the rotatable shaft having radially extending guide means thereon, a second end plate rotatably sleeved on the shaft having grooves therein extending at an angle to the radii of the shaft and centrifugal weights positioned between the plates guided in radial movement by the guide means and balls carried by the individual weights and extending into the grooves operable to similarly limit the radial movement of each of said weights.

Another object is to provide a governor as set forth which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is an elevation view of a mechanical governor in accordance with the invention installed on a carburetor of an internal combustion engine with the governing mechanism in the inactivated position and the throttle open.

FIGURE 2 is an enlarged partial section of the governor mechanism illustrated in FIGURE 1 taken on the line 2—2 in FIGURE 1.

FIGURE 3 is an enlarged partial cross section of the centrifugal weight assembly of the governor illustrated in FIGURE 1 taken on the line 3—3 in FIGURE 1.

FIGURE 4 is a partial cross section of the centrifugal weight assembly illustrated in FIGURE 3, taken on the line 4—4 in FIGURE 3.

Figure 5:
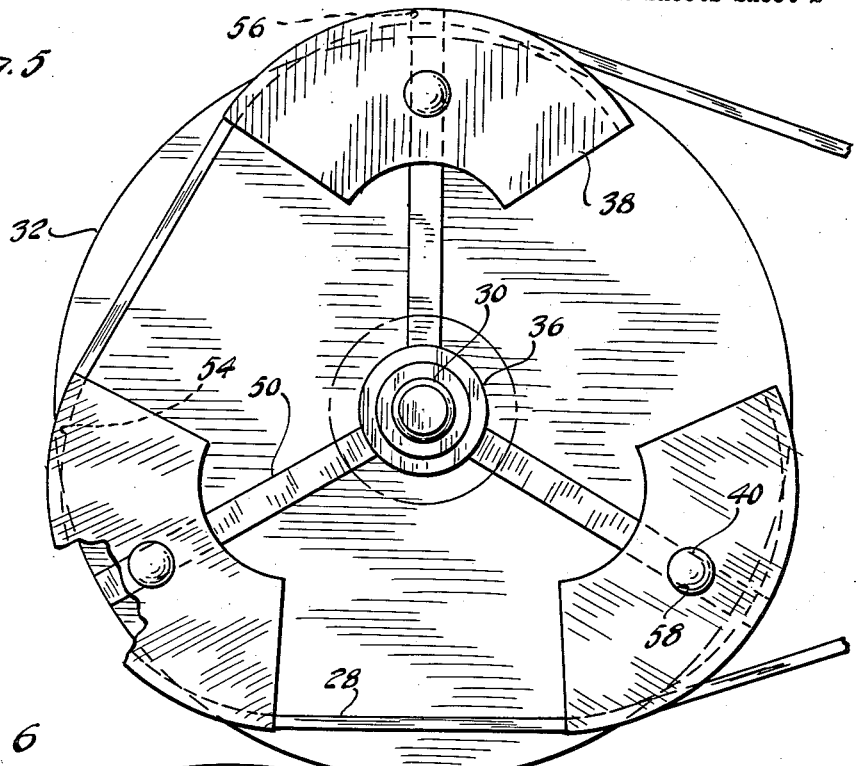
FIGURE 5 is a cross section of a centrifugal weight assembly illustrated in FIGURE 3 taken on the line 5—5 in FIGURE 3 and showing the position of the grooves in the rotatable end plate in broken lines.

With particular reference to the figures a specific embodiment of the invention will now be disclosed.

The mechanical governor 10 including the centrifugal weight assembly 12 of the invention is illustrated in FIGURE 1 as being attached to a carburetor 14. The carburetor 14 includes a throttle valve 16 fixedly secured to the throttle shaft 18 for rotation therewith to open or close the induction passage 20 of the carburetor 14 whereby the speed of the engine 22 on which the carburetor 14 is mounted may be controlled.

The mechanical governor 10 comprises the housing 24, the centrifugal weight assembly 12 previously mentioned and the pulley assembly 26. The centrifugal weight assembly 12 is operable on rotation to develop a force in the belt 28. The force developed by the centrifugal weight assembly 12 in the belt 28 causes pivoting of the pulley assembly 26 to move the throttle valve 16 toward a closed position to produce governing of the engine 22.

More specifically the centrifugal weight assembly 12 of the invention, as shown best in FIGURES 3–6, comprises a shaft 30 which is rotatably mounted in the housing 24, the fixed end plate 32 secured to the shaft 30 for rotation therewith, the movable end plate 34 rotatably mounted on boss 36 of the housing 24 and the individual weights 38 and balls 40.

The shaft 30 includes the enlarged portion 43 supporting the fixed end plate 32 which may be constructed integrally therewith as shown in FIGURE 3. The end 44 of the shaft 30 is rotatably positioned in the recess 46 in the boss 36 of housing 24. A square recess 48 is provided in the other end of the shaft 30 for connection to means rotated at a speed related to the speed of the engine 22 to produce rotation of shaft 30 at distributor shaft speed.

The fixed end plate 32 as shown best in FIGURE 5 is provided with radially extending rectangular guides 50 integral with the inner surface thereof. The individual weights 38 are guided along the guide means 50 in their radial movement on rotation of the shaft 30.

Figure 6:
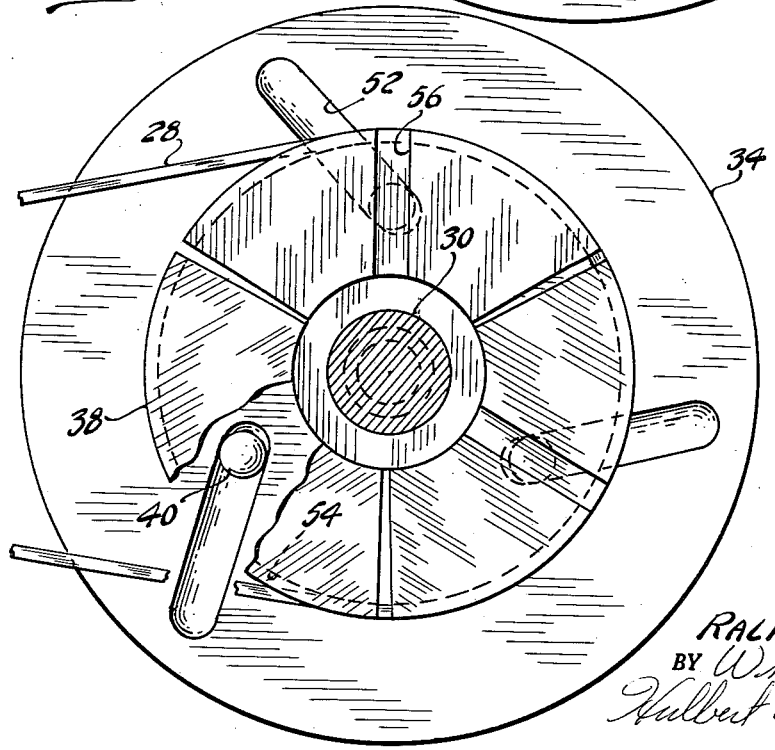
FIGURE 6 is a partly broken away cross section of the centrifugal weight assembly shown in FIGURE 3 taken on the line 6—6 in FIGURE 3 with the weight assembly in an inactivated condition.

The rotatable end plate 34, as shown best in FIGURE 6, is provided with slots 52 therein which extend both radially and circumferentially of the plate 34 so as to form an angle with the radii of shaft 30, as shown in FIGURE 6. The slots 52 are adapted to receive the balls 40 for movement therealong on radial movement of the weights 38.

The weights 38, as best shown in FIGURES 4 and 5, include the track 54 in the outer periphery thereof in which the belt 28 travels during rotation of the centrifugal weight assembly 12 and together form a pulley, the peripheral dimension of which varies as the weights 38 move radially, as shown in FIGURES 5 and 6. The weights 38 are also provided with the rectangular groove 56 in one side thereof slidably engaging the guides 50 of the end plate 32, so that the weights 38 are guided in their radial movement. A hemispherical recess 58 is provided in the side of the weights 38 opposite the recess 56 into which the ball 40 is placed.

Thus in operation of the centrifugal weight assembly 12, as the shaft 30 is rotated, the individual weights will be moved radially outwardly along the guide means 50 of the fixed end plate 32 due to centrifugal force. During this time the balls 40 will move radially outwardly with the weights 38 to cause rotation of the rotatable end plate 34 about the boss 36 due to the engagement of the balls 40 with the surfaces of slots 52.

With such construction it will be seen that as the individual weights are rotated into a position wherein they are not restrained by the belt 28, they are restrained from moving radially outwardly further than the other weights which are restrained by the belt 28 since the balls 40 cannot move along the slots 52 without rotating the rotatable end plate 34 which rotation is resisted by the balls 40 carried by the weights prevented from moving radially outwardly by the belt 28.

Thus with the weight assembly of the invention the weights 38 are prevented from oscillating radially as they are rotated past the position in the cycle thereof wherein they are not restrained by the belt 28. The noise of operation and wear of the parts of the weight assembly 12 of the invention is therefore greatly reduced.

The pulley assembly 26 includes the pulley arm 55 rotatably mounted on the throttle shaft 18, the pulley 42 mounted on the end 57 of the pulley arm 55 and the restraining arm 59 secured to the throttle shaft 18 for rotation therewith. Pulley arm 55 is biased in a counterclockwise direction by the spring 60 connected at one end to the housing 24 and at the other to end 62 of the pulley lever 55. The restraining arm 59 and the throttle shaft 18 are biased in a counterclockwise direction by the spring 64 secured to the restraining arm 59 at one end and to the adjusting screw 66 at the other end.

In operation as the throttle 16 is opened by convenient means, such as an accelerator pedal (not shown), the restraining arm 59 rotates counterclockwise into the position shown in FIGURE 1. As the speed at which governing is desired is approached the belt 28 will exert a force on the pulley 26 to cause the pulley arm 55 to pivot in a clockwise direction around the throttle shaft 18 whereby the tab 68 of the restraining arm 59 will come in contact with the pulley arm 55. On further clockwise movement of the pulley arm 55 the restraining arm 59 is caused to move in a clockwise direction therewith to cause the throttle 16 to close.

In over-all operation the centrifugal weight assembly 12 is rotated in accordance with a parameter such as engine speed which it is desired to govern. As the engine approaches a predetermined speed the centrifugal weights 38 of the weight assembly 12 are moved radially outwardly of the shaft 30. During this movement the weights are each caused to maintain the same relative radial locations due to the provision of the rotatable end plate 34 and the ball 40 moving in the slots 52 in the end plate 34 in accordance with the invention.

Thus the peripheral dimension of the pulley formed by the weights 38 around which the belt 28 must travel increases with engine speed so that the belt 28 applies a force to the pulley 42 to move the pulley 42 in a clockwise direction as indicated above. The movement of the pulley 42 in a clockwise direction causes closing of the throttle 16 and governing of the speed of the engine 22.

Thus it will be seen that in accordance with the invention an improved centrifugal weight assembly is provided for the mechanical governor 10. With the centrifugal weight assembly 12 as shown and described above the problem of individual weights moving radially outwardly a large distance when unrestrained by the belt 28 necessitating bringing the weights back into the radial position assumed thereby when they are under restraint of the belt 28 with the resultant noise and inefficient operation of the governor is eliminated.

The drawings and the foregoing specification constitutes a description of the improved governor in such full, clear, concise and exact terms as to enable any person skilled in the art to practice the invention, the scope of which is indicated by the appended claims.

What I claim as my invention is:

1. A centrifugal weight assembly, comprising a rotatable shaft, a pair of plates mounted on said shaft in axial spaced relation, one of said plates being fixed to said shaft for rotation therewith the other of said plates being rotatable with respect to said shaft, a pulley coaxial with said shaft and positioned between said plates, said pulley being divided into a plurality of weight segments, means acting between said one plate and each of said weight segments for guiding said segments in radial movement on rotation of said shaft, whereby the effective peripheral dimension of said pulley varies on rotation of said shaft, and ball and slot means extending obliquely with respect to the radii of said other plate acting between each of said weight segments and said other plate for maintaining all of the weight segments in the same relative radial position on radial movement thereof.

2. A centrifugal weight assembly, comprising a rotatable shaft, a pair of plates mounted on said shaft in axial spaced relation, one of said plates being fixed to said shaft for rotation therewith, the other of said plates being rotatable with respect to said shaft, a pulley coaxial with said shaft and positioned between said plates, said pulley being divided into a plurality of weight segments, means acting between said one plate and each of said weight segments for guiding said segments in radial movement on rotation of said shaft, whereby the effective peripheral dimension of said pulley varies on rotation of said shaft, a plurality of separate linear slots in said other plate, each intersecting the radii of the plate at the same oblique angle, and a ball positioned partly in each of said weight segments and partly in one of the separate slots for maintaining all of the weight segments in the same relative radial position on radial movement thereof.

3. A centrifugal weight assembly, comprising a rotatable shaft, a pair of plates mounted on said shaft in axial spaced relation, one of said plates being fixed to said shaft for rotation therewith, the other of said plates being rotatable with respect to said shaft, a pulley coaxial with said shaft and positioned between said plates, said pulley being divided into a plurality of weight segments, separate tongue and groove means acting between said one plate and each of said weight segments for guiding said segments in radial movement on rotation of said shaft, whereby the effective peripheral dimension of said pulley varies on rotation of said shaft, and ball and linear slot means extending obliquely with respect to the radii of said other plate acting between each of said weight segments and said other plate for maintaining all of the weight segments in the same relative radial position on radial movement thereof.

4. A centrifugal weight assembly, comprising a rotatable shaft, a pair of plates mounted on said shaft in axial spaced relation, one of said plates being fixed to said shaft for rotation therewith, the other of said plates being rotatable with respect to said shaft, a pulley coaxial with said shaft and positioned between said plates, said pulley being divided into a plurality of weight segments, means acting between said one plate and each of said weight segments for guiding said segments in radial movement on rotation of said shaft including a groove in each of said separate weight segments and a plurality of separate radially extending tongues on the one plate received within the groove in separate weight segments whereby the effective peripheral dimension of said pulley varies on rotation of said shaft, a plurality of separate linear slots in said other plate, each intersecting the radii of the other plate at the same oblique angle, and a plurality of balls one of which is positioned partly in each of said weight segments and partly in one of the separate slots for maintaining all of the weight segments in the same relative radial position on radial movement thereof.

5. A centrifugal weight assembly, comprising a rotatable shaft, hub means for rotatably supporting one end of said shaft, a first plate concentric with said shaft sleeved over said hub for rotation with respect thereto, a second plate secured to said shaft for rotation therewith in spaced relation axially of said shaft with respect to said first plate, a pulley including a plurality of separate weight segments radially movable with respect to said shaft on rotation of said shaft positioned between said first and second plates, each of said separate weight segments having a radially extending groove in a surface thereof adjacent said second plate, a radially extending tongue on said second plate adjacent each of said separate weight segments positioned within the groove therein for guiding said weight segments in radial movement on rotation of said shaft, a separate linear slot in said first plate adjacent each of said weight segments, each of said slots extending at the same oblique angle to the radii of the first plate and a plurality of balls one of which is secured partly in each of said weight segments and partly in the slot adjacent the particular weight segment for maintaining each of the separate weight segments in the same relative radial position on radial movement of the separate weight segments radially outwardly of the shaft.

6. A centrifugal weight assembly, comprising a rotatable shaft, a pair of plates mounted on said shaft in axial spaced relation, a first of said plates being fixed to said shaft for rotation therewith, the second of said plates being rotatable with respect to said shaft, a pulley coaxial with said shaft and positioned between said plates, said pulley being divided into a plurality of weight segments, means acting between one of said plates and each of the weight segments for guiding said segments in radial movement on rotation of said shaft whereby the effective peripheral dimension of said pulley varies on rotation of said shaft, and ball and slot means extending obliquely with respect to the radii of the other of said plates acting between each of said weight segments and said other plate for maintaining all of the weight segments in the same relative radial position on radial movement thereof.

References Cited in the file of this patent

UNITED STATES PATENTS

| | | |
|---|---|---|
| 121,968 | Shaw | Dec. 19, 1871 |
| 189,193 | Collet | Apr. 3, 1877 |
| 1,054,935 | Pearson | Mar. 4, 1913 |
| 1,604,936 | Tabb | Oct. 26, 1926 |
| 1,722,034 | Braun | July 23, 1929 |
| 1,880,456 | Moorehouse | Oct. 4, 1932 |
| 2,552,036 | Duzy | May 8, 1951 |

FOREIGN PATENTS

| | | |
|---|---|---|
| 293,620 | Italy | Feb. 26, 1932 |
| 59,936 | France | Mar. 17, 1954 |